(12) United States Patent
Spragg et al.

(10) Patent No.: US 6,460,586 B1
(45) Date of Patent: Oct. 8, 2002

(54) MULTI-REGION BAND ELEMENT FOR RUN FLAT TIRE

(75) Inventors: Charles D. Spragg, Hudson; James M. Kirby, Akron, both of OH (US); Edward G. Markow, Jensen Beach, FL (US)

(73) Assignee: Bridgestone/Firestone North American Tire, LLC, Nashville, TN (US)

(*) Notice: Subject to any disclaimer, the term of this patent is extended or adjusted under 35 U.S.C. 154(b) by 0 days.

(21) Appl. No.: 09/537,916

(22) Filed: Mar. 29, 2000

(51) Int. Cl.[7] .............................. B60C 9/18; B60C 17/00
(52) U.S. Cl. ........................ 152/516; 152/526; 152/532; 152/536; 152/537
(58) Field of Search ............................... 152/516, 526, 152/527, 536–537, 197, 532; 156/184, 117, 148, 169

(56) References Cited

U.S. PATENT DOCUMENTS

| | | | |
|---|---|---|---|
| 1,411,516 A | 4/1922 | Reider | |
| 2,017,071 A | 10/1935 | Minor | 18/59 |
| 3,090,417 A | 5/1963 | Spelman | |
| 3,842,885 A | 10/1974 | Alban | 152/361 R |
| 3,850,219 A | 11/1974 | Snyder | 153/361 DM |
| 3,933,566 A | 1/1976 | Seiberling | 156/272 |
| 4,094,354 A | 6/1978 | Ferrell et al. | 152/361 R |
| 4,111,249 A * | 9/1978 | Markow | 152/330 |
| 4,287,924 A | 9/1981 | Deck et al. | 152/153 |
| 4,318,434 A | 3/1982 | Markow | 152/156 |
| 4,428,411 A | 1/1984 | Markow et al. | 152/330 RF |
| 4,456,048 A | 6/1984 | Markow et al. | 152/330 RF |
| 4,459,167 A | 7/1984 | Markow et al. | 156/110.1 |
| 4,673,014 A | 6/1987 | Markow | 152/156 |
| 4,734,144 A | 3/1988 | Markow | 156/123 |
| 4,794,966 A | 1/1989 | Markow | 152/516 |
| 4,989,658 A | 2/1991 | Maathuis et al. | 152/533 |
| 5,367,014 A * | 11/1994 | Morehart | 524/526 |
| 5,368,082 A | 11/1994 | Oare et al. | 152/517 |
| 5,427,166 A | 6/1995 | Willard, Jr. | 152/454 |
| 5,660,656 A * | 8/1997 | Herbelleauu | 152/547 |
| 5,795,417 A | 8/1998 | Damke et al. | 152/527 |
| 5,879,484 A | 3/1999 | Spragg et al. | 152/516 |
| 6,112,791 A * | 9/2000 | Spragg | 152/533 |

FOREIGN PATENT DOCUMENTS

| | | |
|---|---|---|
| EP | 0 191 124 | 8/1986 |
| EP | 0 400 859 | 5/1990 |
| EP | 0 537 780 | 4/1993 |
| EP | 0 853 009 A2 | 11/1997 |
| EP | 853 009 | 7/1998 |
| EP | 949 090 | 11/1999 |
| JP | 63141809 | 12/1986 |

OTHER PUBLICATIONS

Derwent Abstract of EPO Publication 0 191 124.
**Derwent Abstract provides English language explanation per 37CFR 1.98(a)(3).

* cited by examiner

Primary Examiner—Michael W. Ball
Assistant Examiner—Justin R Fischer
(74) Attorney, Agent, or Firm—John M Vasuta; Meredith Palmer; Michael Sand (57) ABSTRACT

A run flat pneumatic tire includes a thin annular band embedded in the crown portion of the tire wherein the band is formed with three distinct regions. Radially spaced inner and outer regions are formed of high modulus materials and a central region is formed of a material more elastic than the other two regions providing a band having high interlaminar shear strength. Reinforcing fibers are placed in various orientations in certain of the regions to enable various materials to achieve the required band stiffness for load carrying capability and the interlaminar shear strength at the central axis of the band.

17 Claims, 8 Drawing Sheets

MULTI-REGION BAND ELEMENT FOR RUN FLAT TIRE

BACKGROUND OF THE INVENTION

Technical Field

The invention relates to pneumatic tires and more particularly to a run flat pneumatic tire containing a thin annular band element which acts as a structural compression member when the tire is in the unpressurized or uninflated state which allows loads to act over a substantial portion of the circumference of the tire to enable the tire to run in the unpressurized condition, wherein the band element is comprised of multiple regions with an interior region being more elastic than radial outer regions providing high interlaminar shear strength to the band element.

Background Information

Various tire constructions have been developed over the years which enable a tire to run in an uninflated or underinflated condition, such as after receiving a puncture and a complete or partial loss of pressurized air, for extended periods of time and at relatively high speeds. This enables the vehicle operator to safely drive the vehicle to an appropriate location for repair or replacement of the tire. These tires are referred to as "run flat tires" and have been successful for certain applications and in certain types of tire constructions. One such type of run flat tire incorporates a thin annular high strength band element which acts as a tension member when the tire is pressurized and acts as a structural compression member when the tire is in the unpressurized or partially pressurized state, and are referred to as "banded run flat tires". Some examples of such banded run flat tires are shown in U.S. Pat. Nos. 4,428,411; 4,673,014; 4,794,966; 4,456,084; 4,111,249; 4,318,434; 4,459,167; 4,734,144 and 5,879,484.

Most of the band elements used in these prior art run flat tires have predominantly been made of homogenous materials extending from a radially inside surface to a radially outside surface and form at least one solid thin annular band rigid enough to act as the structural compression member when the tire is in the unpressurized state. Other prior art run flat bands achieve a dual band stiffness by using prestressed fibers in order to improve band performance. Several embodiments of such prior art dual modulus band elements are shown in U.S. Pat. No. 4,456,084. One embodiment has greater resistance to bending forces which tends to decrease its local radius of curvature than to those tending to flatten it. Thus, the band element stiffness is lower for inflated conditions and provides good riding comfort but has a high stiffness in the uninflated condition. A second embodiment shown in this patent has a bending stiffness that increases with increasing stress irrespective of the bending direction. A third embodiment has a two step modulus in which deflection is resisted at one rate and final deflection is resisted at a higher rate. However, all of the dual modulus band elements of U.S. Pat. No. 4,456,084 have the characteristic of the bending stiffness changing as a result of deflection.

The common problem that exists with known prior art band elements which provide good ride characteristics in both the inflated and uninflated conditions is that they are susceptible to interlaminar shear stress and fracture which occurs along the neutral axis of the band. This fracture is due to the constant change in band axial geometry from circular-to-flat as the band moves through the central footprint region. This causes the fibers along the inside diameter of the band element to be in tension and elongate, while the fibers along the outside diameter of the band element are in compression and are shortened. In the uninflated condition, the sidewalls undergo significantly more deflection and thus the band element in the central footprint region conforms to the road surface for a longer distance on both sides of the center of the tire causing greater compression and tension on the band as it moves through the central footprint region. These problems are set forth more fully in U.S. Pat. No. 5,879,484, the contents of which are incorporated herein by reference.

Likewise, as the band element flattens in the central footprint region, there is a natural shearing effect within the band element in order for the inside diameter band element fibers to elongate while the outside diameter band element fibers are shortened. Thus, regardless of whether the band element is made of a homogenous filament wound material or a multi-layered tape fiber/resin composite, the strain/stress regime and transfer shear develop to some degree upon flattening of the band element in the central footprint region because the outer fiber stresses are proportional to the strains. This interlaminar shear strength controls the banded tire durability in both inflated and uninflated conditions.

SUMMARY OF THE INVENTION

In view of the problems set forth above, the need exists for an improved band element for placement in a run flat tire which is less susceptible to failure due to interlaminar shear than heretofore known prior art band elements.

The present invention provides a band element for a run flat tire which is formed of fiber and resin composites having three relatively distinct regions, wherein radially inner and outer regions are of a high modulus material and a central region near the neutral axis of the band, is of a material which is more elastic than the inner and outer regions thereby having a higher interlaminar shear strength than the inner and outer regions.

The invention provides increased interlaminar shear strength across the entire axial length of those band elements which heretofore only had increased strength at the axial ends achieved by tapering the ends thereof, thereby improving band element durability.

Still another aspect of the invention includes providing a band element having a unique arrangement of materials and fiber orientation which provides for optimum performance of the band element.

Another feature of the invention is to provide a band element wherein the central region is made of single or multiple layers of resin, either containing reinforcing fibers or being void of such fibers, with the outer and inner regions preferably being similar and formed of various types of high modulus resinous materials.

A further feature of the invention is to provide a band element wherein the central region is formed of rubber either containing reinforcing fibers or being void of such fibers.

Another aspect of the invention is forming the inner and outer regions of graphite reinforced resins and the interior region formed of a glass reinforced resin.

A still further feature of the invention is forming the central region of a wound fiberglass tow reinforced with fibers, which fibers are either randomly oriented, extend in the circumferential direction, or are spirally wound in the circumferential direction, with the inner and outer regions being filament wound layers of graphite reinforced resin.

A further aspect of the invention is to provide such a band element in which the inner and outer regions are reinforced with graphite fibers which extend predominantly in the circumferential direction, in combination with glass fiber reinforcement extending predominantly in the axial direction, and in which glass fibers are placed near the axial ends of the band in both the inner and outer regions.

Another feature of the invention is to provide a band element in which the inner, outer and central regions can be constructed by known fabrication techniques i.e., homogenous filament winding, non-homogeneous filament winding, multi-layer tape composite winding, winding with prepreg materials, winding with wet woven materials, winding with mats, winding with resin transfer molding processes, winding with wet or prepreg woven preforms, and various combinations of such fabrication techniques.

The foregoing advantages, construction and operation of the present invention will become more readily apparent from the following description and accompanying drawings.

BRIEF DESCRIPTION OF THE DRAWINGS

Similar numerals refer to similar parts throughout the drawings.

DESCRIPTION OF THE PREFERRED EMBODIMENTS

Figure 1:
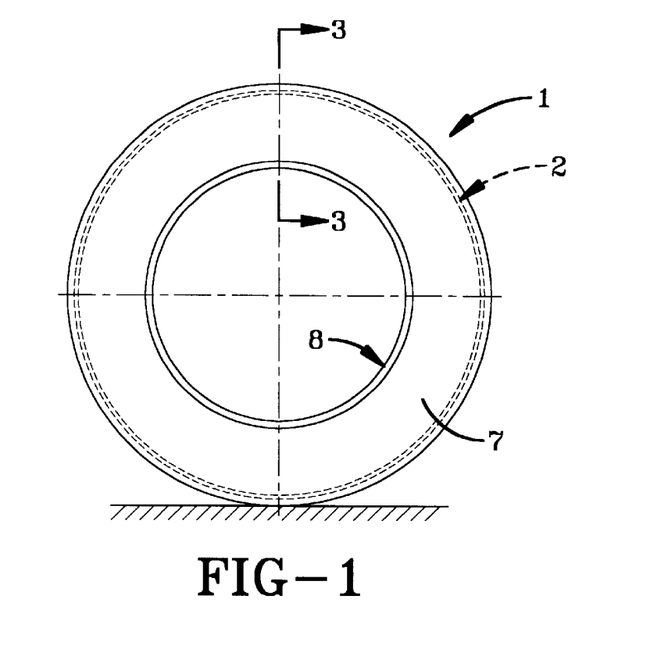
FIG. 1 is a side elevational view of a usual pneumatic run flat tire having the improved band element incorporated therein.
Figure 2:
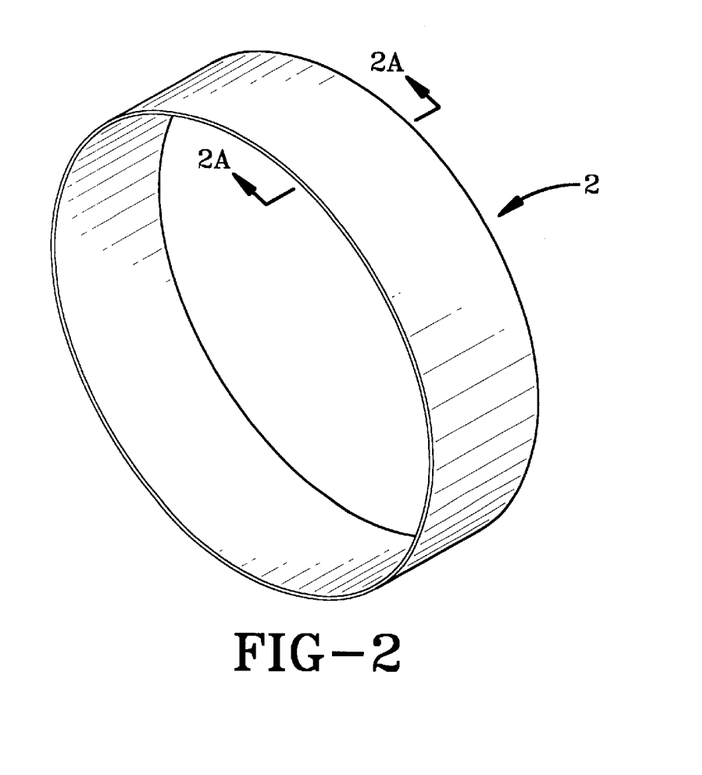
FIG. 2 is an enlarged perspective view of the band element removed from the tire of FIG. 1.
Figure 3:
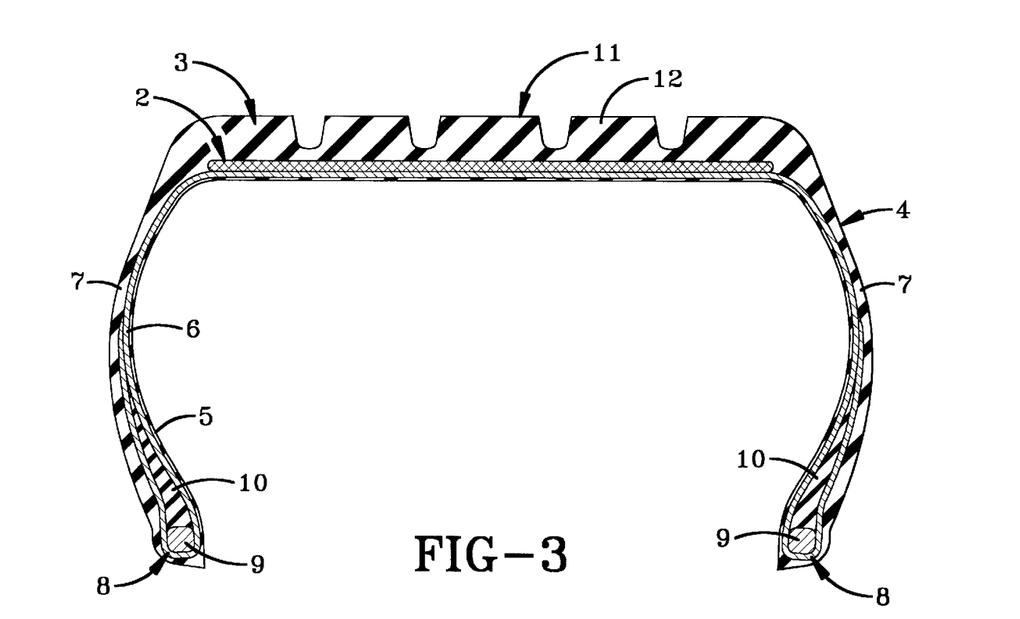
FIG. 3 is a greatly enlarged sectional view taken on line 3—3, FIG. 1.

FIG. 1 is a side elevational view of a pneumatic tire indicated generally at 1, having the improved run flat band 2 (FIG. 2) incorporated therein. Tire 1 is of a usual construction and includes a body ply carcass 4 (FIG. 3) consisting of an innerliner 5, a plurality of body plies 6, and sidewalls 7 extending from a crown portion 3 of the tire to bead packages 8. Each bead package 8 will typically include a bead 9 and a bead filler 10, and may have a gum abrasion strip and other components therein, all of which are well known in the tire building art. Body ply carcass 4 is assembled and then molded with a typical tread package 11 which will contain a tread strip 12 and various reinforcing belts (not shown) contained therein. Band 2 is molded into the crown portion of the tire between tread package 11 and body ply carcass 4 and will extend substantially throughout the length of the crown portion. The molding is accomplished in a usual tire mold, and thus is not described in further detail.

Figure 2A:
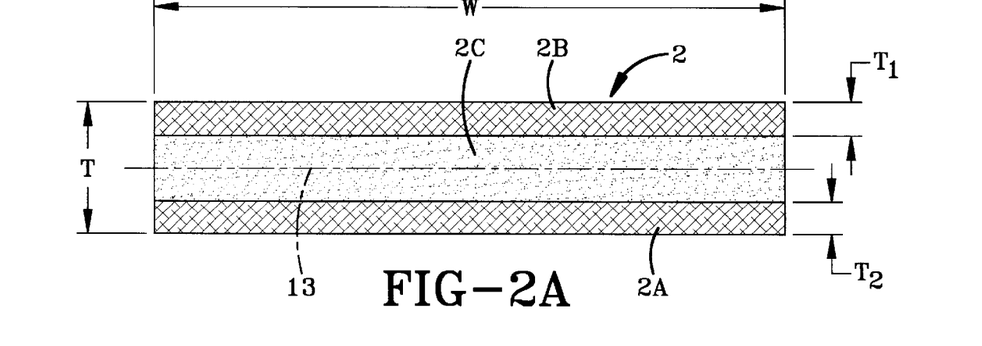
FIG. 2A is a greatly enlarged sectional view taken on line 2A—2A, FIG. 2.

The purpose of improved band element 2 is to increase interlaminar shear strength across the entire axial length, thereby improving durability by fabricating the composite band as set forth below. Common to all of the band embodiments shown and described below is that each band element has three radially distinct regions (FIG. 2A). The radially inner and outer regions 2A and 2B, respectively, consist of materials with a high flexural modulus in the circumferential direction and the central or interior region 2C consists of materials with high interlaminar shear strength. The preferred flexural modulus of the inner and outer regions as determined for example by ASTM D790-97, is within the range of $3.4(10)^{10} Pa < E_{circumferential} < 2.1(10)^{11} Pa$, with the preferred range being $4.1(10)^{10} Pa < E_{circumferential} < 1.4(10)^{11} Pa$.

The overall band thickness indicated at "T" (FIG. 2A) as well as the axial width "W", will be determined so as to carry the load of the particular tire size in which it is being incorporated, while simultaneously providing adequate band element durability. The radial thickness of the outer, central and inner regions can be in various combinations. However, for most constructions, the preferred radial thickness "T" will be within the general range of $T/3 > T_1 > T/10$; $T/3 > T_2 > T/10$, with the preferred range being $T/4 > T_1 > T/8$; $T/4 > T_2 > T/10$, and the most preferred relationship is $T_1 = T_2$. The neutral axis of the band element is indicated at 13 and extends in an axial direction as shown in FIG. 2A. Axis 13 will be at the midpoint of the band element or thickness T, which preferably will be the midpoint of region 2C when $T_1$ and $T_2$ are equal, which is the preferred construction.

Figure 2B:
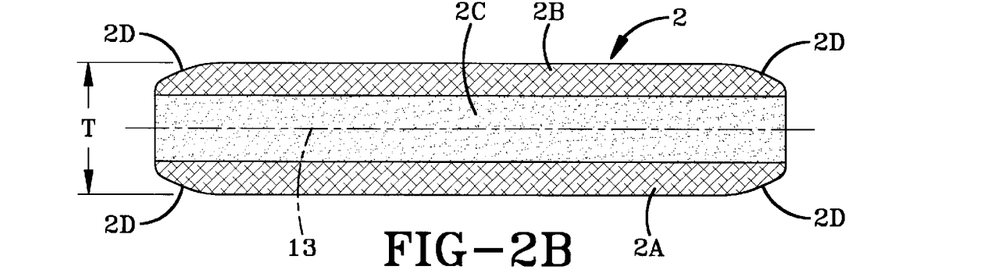
FIG. 2B is a view similar to FIG. 2A showing a cross section of a band element having tapered ends.

FIG. 2B shows a band element similar to that shown in FIG. 2A but having increased interlaminar shear strength at the axial ends achieved by tapering the ends 2D as described in pending U.S. application Ser. No. 09/213,170, filed Dec. 17, 1998. Thus, the constructions and material combinations set forth below are equally applicable to band elements having tapered ends to provide increased interlaminar shear strength completely across the axial width of the band.

It is also readily understood by those skilled in the art that the various constructions of the three regions described below can be accomplished by well known fabrication techniques i.e., homogenous filament winding, non-homogeneous filament winding, multilayer tape composite winding, winding with prepreg materials, winding with wet woven materials, winding with mats, winding with resin transfer molding processes, winding with wet or prepreg woven preforms, and innumerable combinations of some and/or all of the above. One of the important features of the invention is the particular materials and fiber orientations and arrangements thereof, in order to achieve optimum performance of the band element and not specifically the particular fabrication processes used for forming the band element. Although the emphasis is on fiber orientation, band element material properties and strengths, the particular resin, and binding materials holding the fibers together as a composite structure, are also of importance.

Various resin adhesives or combination thereof than those described below can be utilized without affecting the concept of the invention. PPS (Polyphenylsulfide) and PEI (Polytherimide) are representative examples of resins commercially available and suitable for the thermoplastic composites. The thermosetting composites, epoxy adhesives and toughened epoxy adhesives also are readily available materials well known in the art and available from many sources. For example, a toughened epoxy adhesive is identified as F351 from Nippon Zeon (U.S. Pat. No. 5,290,857). Again, those skilled in the art could easily envision alternative resin adhesives which fall within the spirit and concept of the invention.

The above is a general discussion of the various features of improved band element 2 and the three regions thereof, with particular embodiments being set forth below and shown in the various drawings. Although the drawings and following description show and describe three distinct layers, it is understood that the invention refers to a single band element having three regions, each of which has certain properties which can be achieved in a single homogenous manner, even though for most applications and constructions the band element will be constructed of three separate layers.

Figures 4, 5:
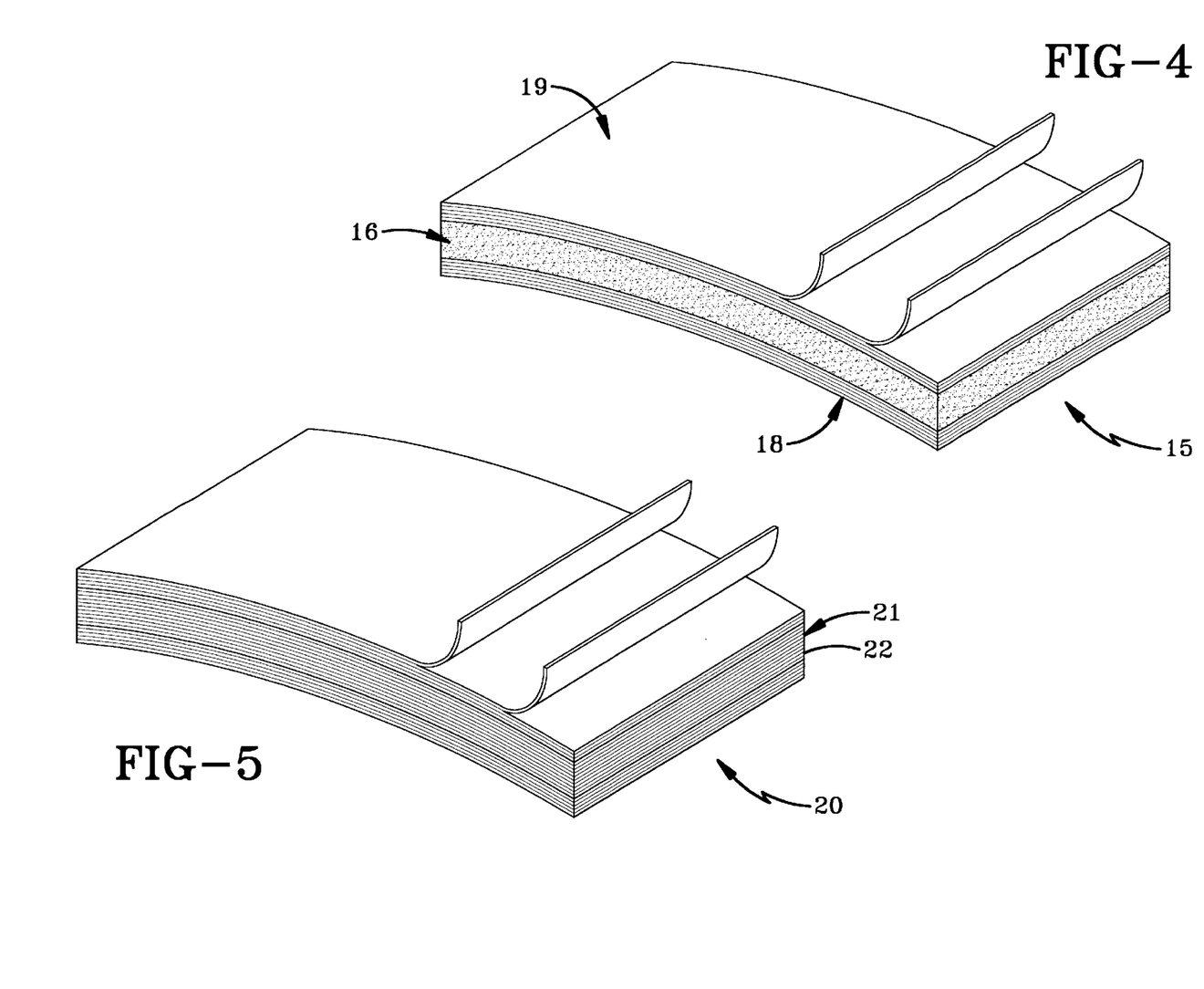
FIG. 4 is an enlarged fragmentary diagrammatic perspective view showing a first embodiment of the improved band element wherein the central region is made of a single layer of resin.
FIG. 5 is a view similar to FIG. 4 of a second embodiment of the band element in which the central region is made of multiple layers of resin tape.

A first embodiment of the improved run flat band is indicated at 15, and shown in FIG. 4. In this embodiment, the interior or central region indicated generally at 16, is formed as a single layer of a suitable resin free of any reinforcing fibers. The resin can be PPS, PEI, epoxy adhesive, a toughened epoxy adhesive or the like as discussed above. The neutral axis 13 preferably will be at the midpoint of central region 16. Radial inner layer 18 and radial outer layer 19 can be formed of various materials such as various types of thermoplastic tapes or layers of thermosetting resins, and can be formed by known fabrication processes set forth above. Preferably inner and outer regions 18 and 19 will be of the same material and of the same thickness, and most importantly will have a higher modulus than that of central region 16. This embodiment is simple and economical when forming the inner and outer regions as multiple layer tape band elements.

A modified band element from that of FIG. 4 is shown in FIG. 5, and is indicated generally at 20. In this embodiment, central region 21 is made of multiple layers of resin-only tape 22 which are laid up to form central region 21 in a similar manner as described in U.S. Pat. No. 5,879,484. The outer and inner regions 18 and 19 preferably are the same as for band element 15.

Prior art band element durability typically is limited by interlaminar shear failure at the tape interfaces within the central region and/or interlaminar shear failures within the individual fiber reinforced tapes. For prior art multi-layer tape band elements, failure within the resin initiates, in a micro sense, at the interface voids between the resin and fiber. As the effect of these voids accumulate, the crack density increases, ultimately to band element failure. Thus, by decreasing and/or eliminating both the resin/fiber interfaces and resin/resin interfaces and their associated void phenomena in the central region of multiple tape band elements, as accomplished in central regions 16 and 21 of band elements 15 and 20, it reduces considerably this interlaminar failure and provides a tangible increase in band element durability. An additional benefit is lower cost, in that, the central resin-only regions 16 and 21 are likely to be less expensive per unit than the resin/fiber composite material heretofore utilized.

Figures 6, 7:
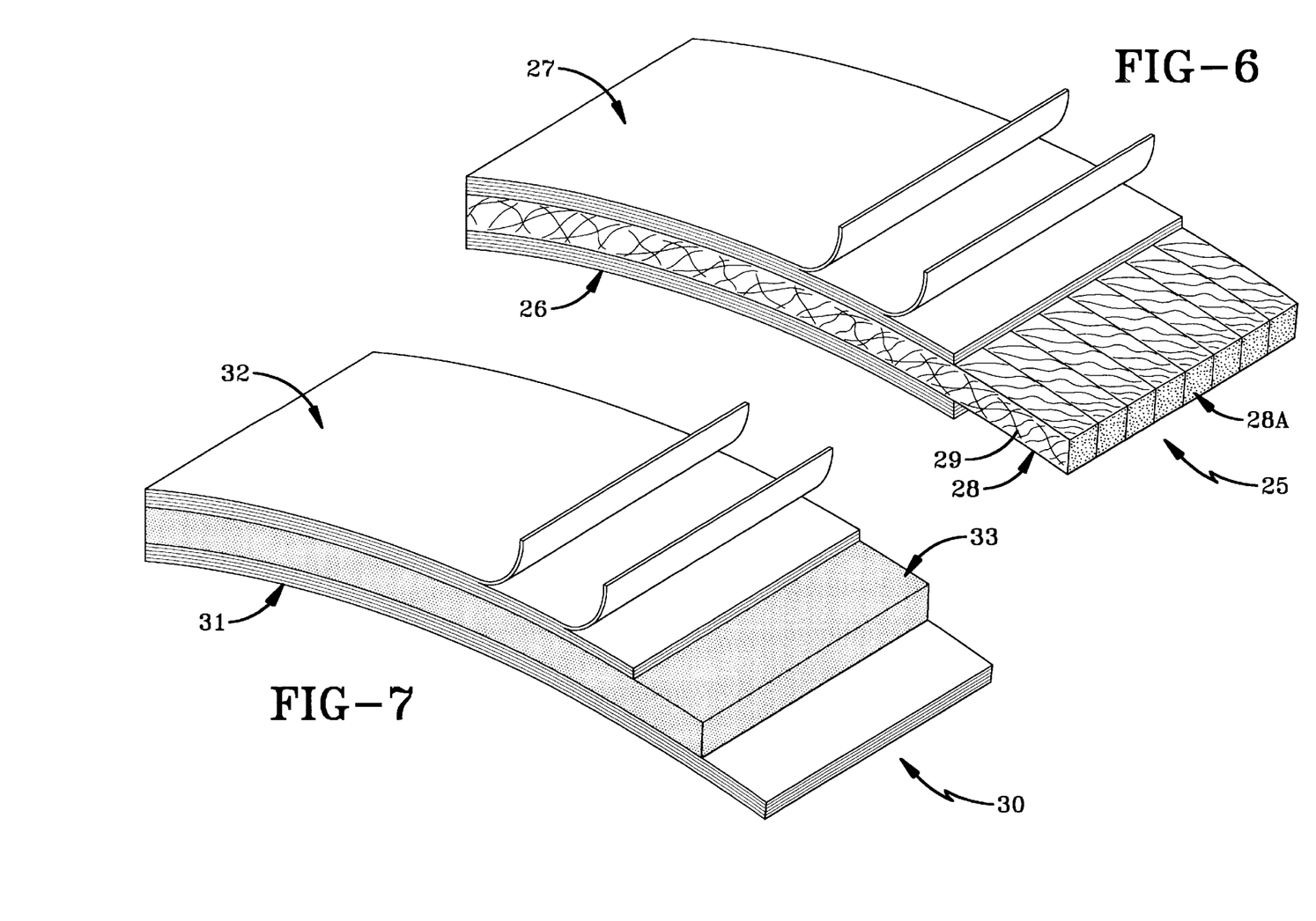
FIG. 6 is an enlarged fragmentary diagrammatic perspective view of a third embodiment of the band element wherein the central region consists of a layer of resin reinforced with randomly oriented fibers.
FIG. 7 is an enlarged fragmentary diagrammatic perspective view of a fourth embodiment of the band element wherein the central region is a layer of rubber.

A third embodiment is shown in FIG. 6 and is indicated generally at 25. Band has inner and outer regions 26 and 27 similar to regions 18 and 19 discussed above, and a central region 28. Central region 28 consists of resin reinforced by randomly oriented fibers 29, which fibers extend in the circumferential direction, the radial direction, the lateral direction and combinations thereof. A filament winding process is the preferred method for forming central region 28 which produces a thick tow 28A of randomly oriented fibers which is then wound into central region 28. However, the other fabrication techniques discussed above can also be utilized.

The randomly oriented fibers 29 in central region 28 are available to resist the interlaminar shear slippage of the circumferential planes because the fibers clearly cross the neutral axis in all directions. Additionally, this random arrangement of fibers 29 provide for increased peel strength of the band element where peel strength is characterized by the ability of the band element to withstand stresses in the radial direction. Also, since central region 28 consists of a single layer of tow 28A wound axially whereby the number of resin interfaces in the radial direction is greatly reduced. This increases the interlaminar shear strength via fibers crossing the neutral axis and increases the peel strength of the band element, thereby increasing the final durability of the band whether the tire is inflated, partially inflated or uninflated.

A fourth embodiment is shown in FIG. 7 and indicated generally at 30. Embodiment 30 includes inner and outer regions 31 and 32, which preferably are similar to the inner and outer regions discussed above for embodiments 15, 20 and 25. In band 30, central region 33 is formed of a layer of rubber. This rubber layer will bond the inner and outer regions together so that the three regions function as one monolithic fiber/resin/rubber composite. The rubber will have sufficient strength to hold the three regions together so that in bending the cross sectional moment of inertia is based upon the aggregate of the three regions. Rubber central region 33 also provides compliance between the inner and outer regions in a manner such that the interlaminar shear strength of the rubber exceeds the cyclic life stress cycles exerted on the band as it moves repeatedly through the footprint region. In addition, because rubber is a viscoelastic material that generates heat during each cycle and stores a small percentage of that heat internally, the rubber preferably will be of a low hysteresis material so as not to generate excess heat and self destruct. Forming central layer 33 of rubber is also economical in that it is less expensive than resin/fiber composite material.

One material well suited for forming central region 33 is a rubber compound having a high modulus and a low tanδ. Accordingly, a preferred sulfur vulcanizable rubber compound, which following vulcanization, has a mechanical static modulus in the range of $9.7(10)^6 Pa$ to $2.8(10)^7 Pa$ at 15% strain, a loss modulus or tanδ in the range of 0.03 to 0.20 measured at 100° C., 7% deflection and 10 Hz, and has a Shore A hardness in the range of 70 to 97.

Figures 8, 9:
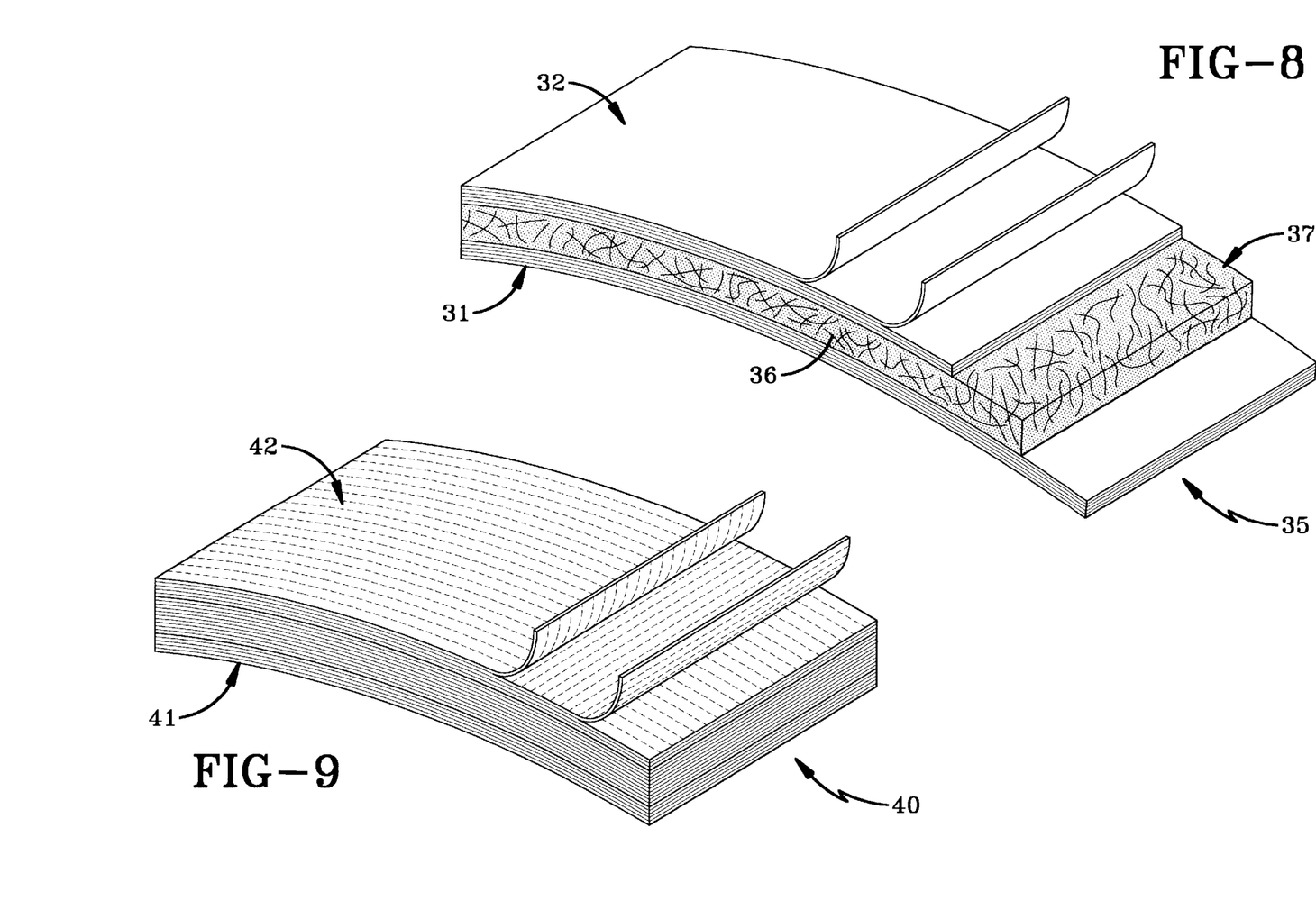
FIG. 8 is a view similar to FIG. 7 of a fifth embodiment of the band element wherein fibers are randomly placed throughout the central rubber region.
FIG. 9 is an enlarged fragmentary diagrammatic perspective view of a sixth embodiment of the band element wherein the radially inner and outer regions are reinforced with graphite fiber with the central region being reinforced with glass fiber.

A slightly modified band element from that of band element 30 is indicated at 35 and shown in FIG. 8. In this embodiment, a plurality of randomly oriented fibers 36 are placed throughout central rubber region 37 for further increasing the interlaminar shear strength of the composite band element. Again, the elastomeric central regions 33 and 37 will be more elastic and have lower modulus than that of inner and outer regions 31 and 32, to achieve the desired advantages of the three region band element.

A sixth embodiment of the improved band element is indicated at 40, and shown in FIG. 9. Embodiment 40 illustrates a multi-layer tape band element hybrid arrangement wherein inner region 41 and outer region 42 are reinforced with graphite fibers 43 while central region 44 is reinforced with glass fibers 45. This embodiment enables the superior tensile strength and fatigue properties of the inner and outer regions made of graphite fibers to be utilized at the same time with the superior interlaminar shear strength in fatigue properties of the central region made of glass fibers. Graphite fiber reinforced composites have superior flexural strength in fatigue whereas fiberglass reinforced composites have superior shear strength in fatigue. This arrangement provides a good match between the materials and their placement in the band with an additional benefit being economic, in that the central region of fiberglass reinforcement is less expensive per unit than if graphite fiber material were used. Also, the fatigue strength and durability of band element 40 will be improved because of the good match between the materials and the environment in which they must operate. Thus, band element 40 takes advantage of the materials, such as fiberglass, which are better suited for interlaminar shear stress, being used in central region 44, with graphite fibers 43 which are better suited for tensile fatigue stress, being used in the outer regions 41 and 42.

Figures 10, 11:
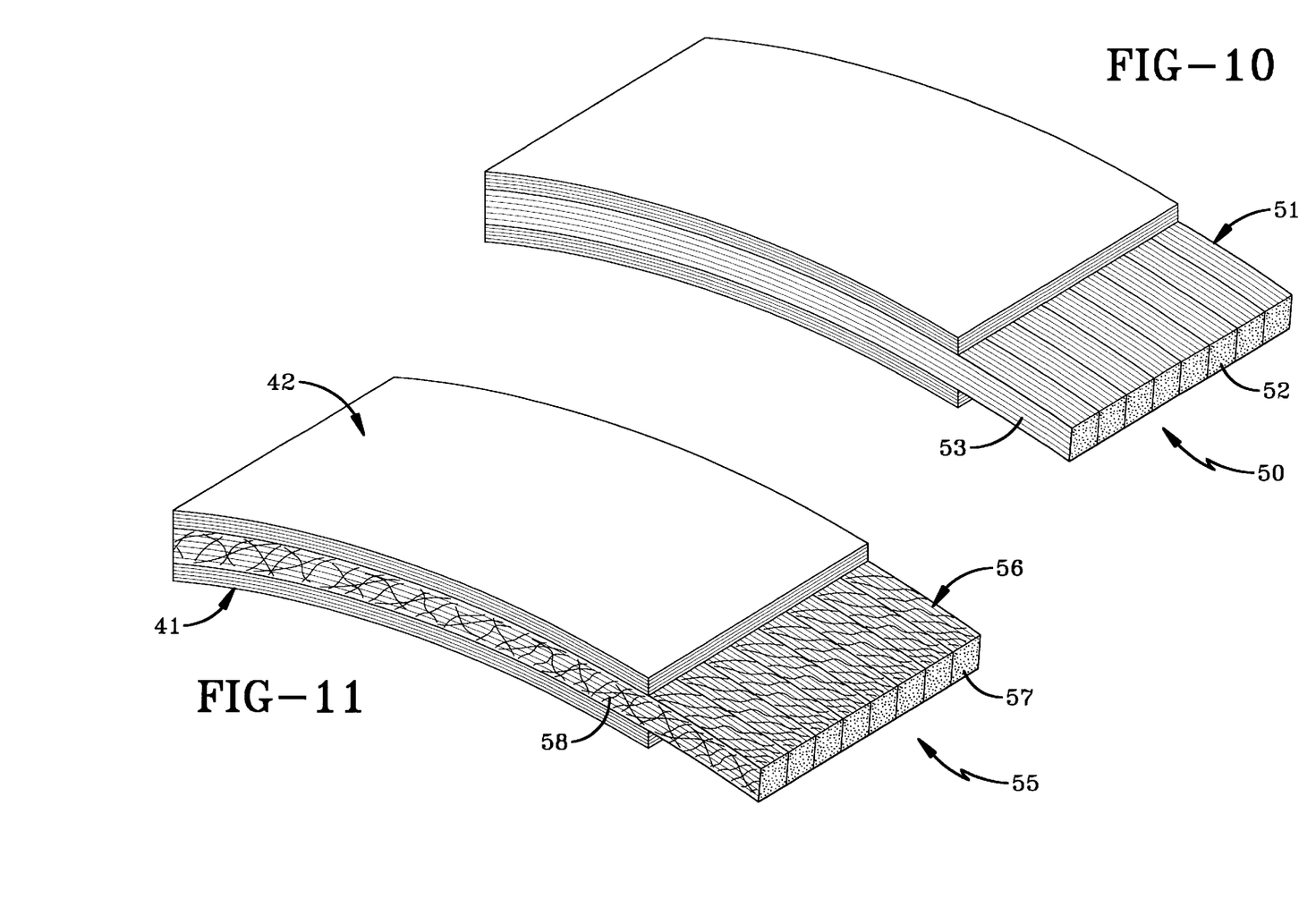
FIG. 10 is an enlarged fragmentary diagrammatic perspective view of a seventh embodiment of the band element wherein the central region is wound of one large fiberglass tow with reinforcement fibers oriented in the circumferential direction within the tow.
FIG. 11 is a view similar to FIG. 10 of an eighth embodiment wherein the central region is wound of one large fiberglass tow with reinforcement fibers oriented randomly within the tow.

A seventh embodiment of the improved band element is indicated at 50, and shown in FIG. 10 and illustrates a filament wound alternative to embodiment 40 shown in FIG. 9. Band 50 has a central region 51 wound of one large fiberglass tow 52 with reinforcement fibers 53 oriented in the circumferential direction within the tow. Inner and outer regions 41 and 42 are filament wound layers of graphite fiber reinforcement, the same as in band 40 discussed above.

A slightly modified band element from that of FIG. 10 is shown in FIG. 11 and is indicated generally at 55. Inner and outer regions 41 and 42 of band 55 are similar to those of bands 40 and 50, wherein the central region 56, is wound of one large fiberglass tow 57 with reinforcement fibers 58 oriented randomly within the tow. Tow 57 is wound circumferentially whereas the fiberglass reinforcement fibers 58 within the tow, are randomly oriented throughout.

Figures 12, 13:
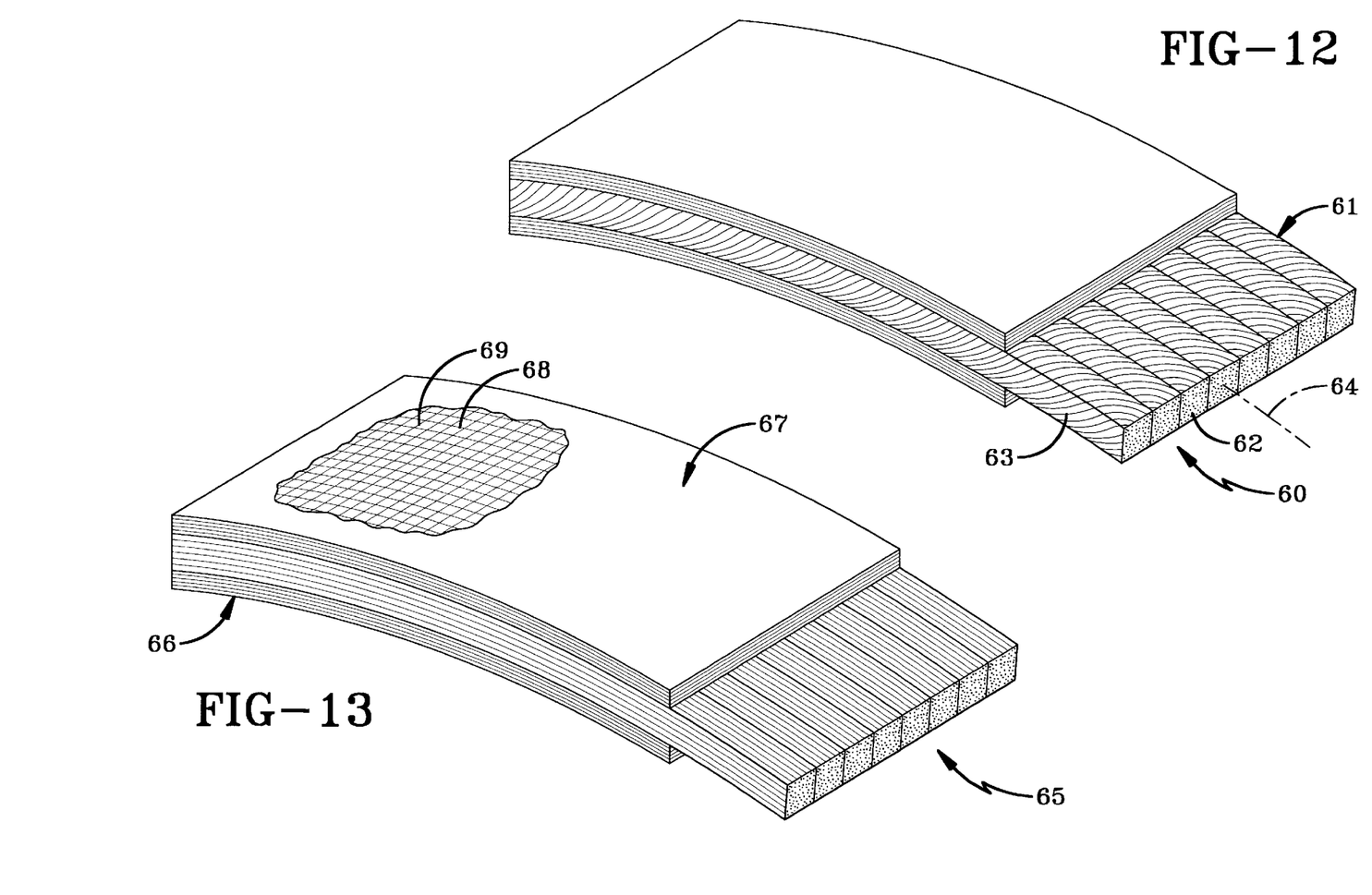
FIG. 12 is a view similar to FIGS. 10 and 11 of a ninth embodiment wherein the central region is wound of one large twisted fiberglass tow with reinforcement fibers oriented spirally in the circumferential direction.
FIG. 13 is an enlarged fragmentary diagrammatic perspective view of a tenth embodiment of the band element utilizing circumferentially extending graphite reinforcing fibers and axially extending glass reinforcing fibers in the inner and outer regions.

FIG. 12 illustrates another band embodiment indicated at 60, wherein a central region 61 is wound of one large twisted fiberglass tow 62 with the fiberglass reinforcement fiber 63 being oriented spirally in the circumferential direction. In this embodiment, fibers 63 are aligned in a spiral about the circumferential axis 64 of the tow, after having been parallel to the axis or length of the tow prior to its twisting.

The concept of a hybrid band element comprised of graphite fibers and glass fibers need not be restricted to the radially distinct regions as discussed above. For example, FIG. 13 depicts an alternative concept or modified band element 65 which utilizes fibers in both inner region 66 and in outer region 67. In the preferred embodiment, graphite fibers 68 are arranged predominantly circumferential in order to provide flexural strength in that direction while glass fibers 69 are arranged predominantly axial in order to provide flexural strength in the lateral direction.

Figure 14:
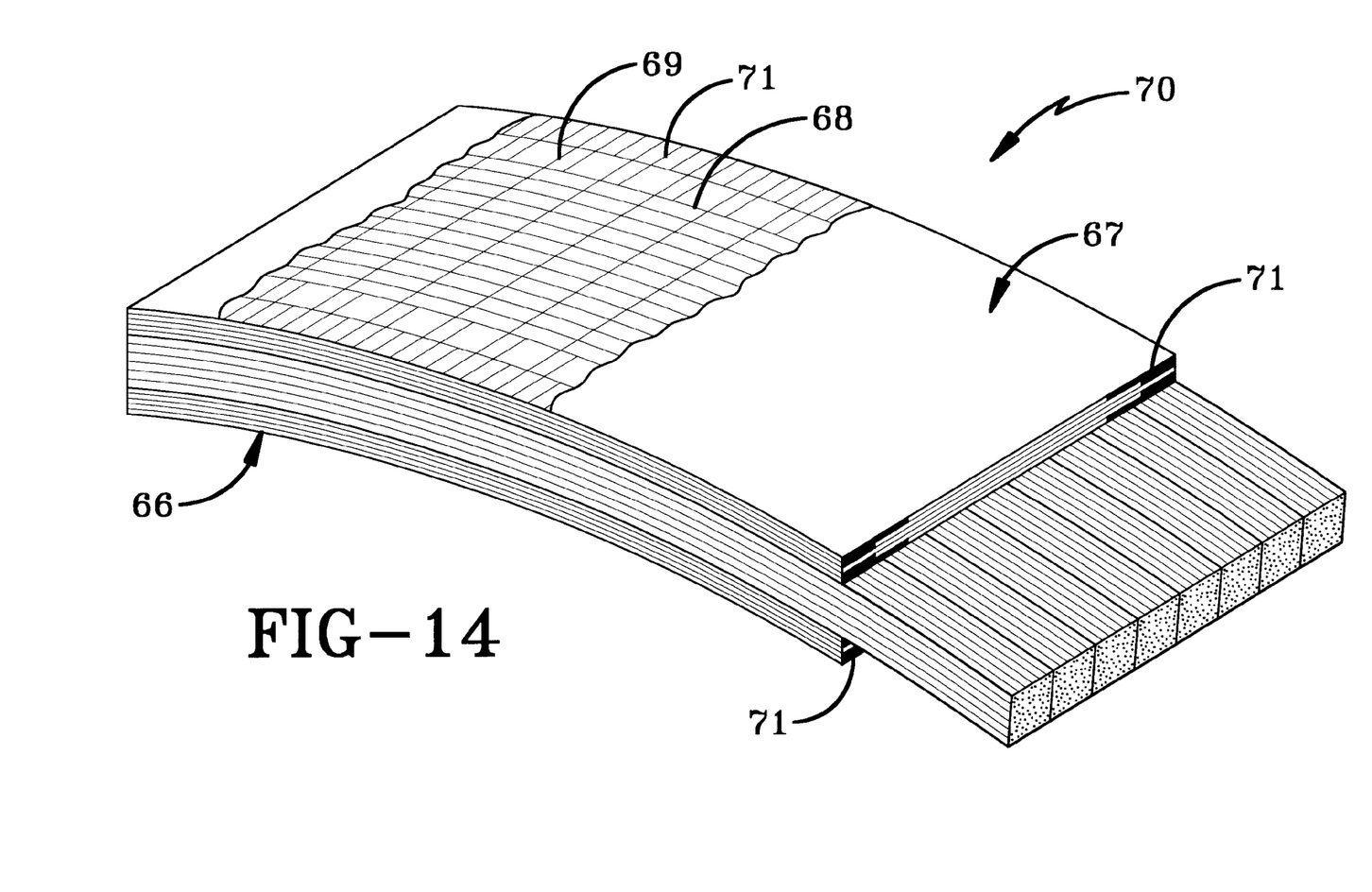
FIG. 14 is another embodiment of the improved band element having graphite and glass fibers in the inner and outer regions with additional glass fiber reinforcement placed near the axial end of the inner and outer regions.

A still further modified band element is indicated generally at 70, and is shown in FIG. 14. Band 70 is another hybrid band element comprised of graphite fibers 68 and glass fibers 69 in inner and outer regions 66 and 67, with additional glass fibers 71 being placed near the axial ends of the band in the circumferential direction for providing some band element edge compliance and to help redistribute the high cyclic stresses applied to the axial ends of the band and to allow the axial center of the band element to carry proportionately more of the load.

FIGS. 9–14 illustrate only a sampling of the various hybrid arrangement of materials which can be utilized in forming the three region composite band element. Again, the uniqueness of these embodiments is utilizing a mixture of graphite and fiberglass reinforcement fibers in the same band element, and furthermore within specific regions of the band element in order to optimize band element fatigue strength and to improve durability of the band element.

However, the main feature of the invention is to optimize band element stiffness through modification of the modulus of elasticity in the circumferential and lateral directions as a result of employment of both graphite and glass fibers. Likewise, the various band embodiments optimize the band element moment of inertia among the three distinct regions so as to improve band element interlaminar fatigue shear strength and durability and the associated banded tire inflated and uninflated durability, by forming the central region of a material which is more elastic than the inner and outer regions.

While the various embodiments of the invention have been described, the invention is not limited thereto.

What is claimed is:

1. A run flat pneumatic tire including an elastomeric casing having a body ply carcass, a tread formed in a crown portion of the tire, and sidewalls extending from the crown portion to bead areas; a band element located between the tread and body ply carcass for resisting compressive forces on the tire when the tire is uninflated, said band element having an axial width and a radial thickness and an interior region located between radially spaced inner and outer regions, said inner and outer regions being formed of a reinforced resin material with said interior region being more elastic than said inner and outer regions and being formed of a non-reinforced resin material.

2. The run flat pneumatic tire defined in claim 1 wherein the resin material of the interior region is selected from the group consisting of PPS (Polyphenylsulfate), PEI (Polyetherimide), and an epoxy adhesive.

3. The run flat pneumatic tire defined in claim 1 wherein the interior region is a plurality of layers of non-reinforced resin tape.

4. The run flat pneumatic tire defined in claim 1 wherein the band element terminates in tapered outer ends.

5. The run flat pneumatic tire defined in claim 1 wherein the band element has a thickness T and the inner and outer regions have a thickness $T_2$ and $T_1$, respectively; and in which the range of thicknesses is $T/3>T_1>T/10$ and $T/3>T_2>T/10$.

6. The run flat pneumatic tire defined in claim 5 wherein $T_1=T_2$.

7. A run flat pneumatic tire including an elastomeric casing having a body ply carcass, a tread formed in a crown portion of the tire, and sidewalls extending from the crown portion to bead areas; a band element located between the tread and body ply carcass for resisting compressive forces on the tire when the tire is uninflated, said band element having an axial width and a radial thickness and an interior region located between radially spaced inner and outer regions, said inner and outer regions being formed of a reinforced resin material, with said interior region being more elastic than said inner and outer regions and is a layer of rubber having a mechanical modulus in the range of $9.7(10)^6$Pa to $2.8(10)^7$Pa at 15% strain and a Shore A hardness in the range of 70 to 97.

8. The run flat pneumatic tire defined in claim 7 wherein the layer of rubber has a loss modulus (tanδ) in the range of 0.03 to 0.20 measured at 100° C., 7% deflection and 10 Hz.

9. The run flat pneumatic tire defined in claim 7 wherein the layer of rubber contains a plurality of randomly oriented fibers.

10. A run flat pneumatic tire including an elastomeric casing having a body ply carcass, a tread formed in a crown portion of the tire, and sidewalls extending from the crown portion to bead areas; a band element located between the tread and body ply carcass for resisting compressive forces on the tire when the tire is uninflated, said band element having an axial width and a radial thickness and an interior region located between radially spaced inner and outer regions, with said interior region being more elastic than at least one of said inner and outer regions, with at least one of said inner and outer regions being reinforced with graphite fibers, and the interior region being reinforced with glass fibers.

11. The run flat pneumatic tire defined in claim 10 wherein the interior region is a wound fiberglass tow with the reinforcing glass fibers oriented in the circumferential direction.

12. The run flat pneumatic tire defined in claim 10 wherein the interior region is a circumferentially wound fiberglass tow with the reinforcing glass fibers being randomly oriented within the tow.

13. The run flat pneumatic tire defined in claim 10 wherein the interior region is a wound fiberglass tow with the reinforcing glass fibers oriented spirally in the circumferential direction.

14. The run flat pneumatic tire defined in claim 10 wherein the inner and outer regions contain graphite and glass fibers, and wherein the glass fibers are positioned adjacent the axial ends of the band and extend in the circumferential direction.

15. A run flat pneumatic tire including an elastomeric casing having a body ply carcass, a tread formed in a crown portion of the tire, and sidewalls extending from the crown portion to bead areas; a band element located between the tread and body ply carcass for resisting compressive forces on the tire when the tire is uninflated, said band element having an axial width and a radial thickness and an interior region located between radially spaced inner and outer regions, with said interior region being more elastic than at least one of said inner and outer regions, with the inner and outer regions each containing circumferentially oriented graphite fibers and axially oriented glass fibers.

16. A run flat pneumatic tire including an elastomeric casing having a body ply carcass, a tread formed in a crown portion of the tire, and sidewalls extending from the crown portion to bead areas; a band element located between the tread and body ply carcass for resisting compressive forces on the tire when the tire is uninflated, said band element having an axial width and a radial thickness and an interior region located between radially spaced inner and outer regions, with said interior region being more elastic than at least one of said inner and outer regions, with said inner and outer regions having a flexured modulus within the range of $3.4(10)^{10}$Pa and $2.1(10)^{11}$Pa.

17. A run flat pneumatic tire including an elastomeric casing having a body ply carcass, a tread formed in a crown portion of the tire, and sidewalls extending from the crown portion to bead areas; a band element located between the tread and body ply carcass for resisting compressive forces on the tire when the tire is uninflated, said band element having an axial width and a radial thickness and an interior region located between radially spaced inner and outer regions, with said interior region being more elastic than at least one of said inner and outer regions, with said inner and outer regions having a flexured modulus within $4.1(10)^1$Pa and $1.4(10)^{11}$Pa.

* * * * *